United States Patent
Iellimo et al.

(10) Patent No.: US 10,752,441 B1
(45) Date of Patent: Aug. 25, 2020

(54) STORAGE SYSTEM HAVING DUAL-ROW PALLET BAYS

(71) Applicant: FRAZIER INDUSTRIAL COMPANY, Long Valley, NJ (US)

(72) Inventors: Domenick Iellimo, Forked River, NJ (US); Aaron Iellimo, Califon, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 16/291,190

(22) Filed: Mar. 4, 2019

(51) Int. Cl.
 *B65G 1/04* (2006.01)
 *B65D 19/42* (2006.01)

(52) U.S. Cl.
 CPC .......... *B65G 1/0492* (2013.01); *B65D 19/42* (2013.01); *B65G 2201/0267* (2013.01)

(58) Field of Classification Search
 CPC .......... B65G 1/0492; B65G 2201/0267; B65G 2207/40; B65D 19/42; B07C 3/087
 See application file for complete search history.

(56) References Cited

U.S. PATENT DOCUMENTS

| | | | | |
|---|---|---|---|---|
| 4,197,047 A * | 4/1980 | Haldimann | ............... | B65G 1/06 414/276 |
| 4,341,313 A * | 7/1982 | Doring | ............... | B65G 1/06 211/151 |
| 5,137,159 A * | 8/1992 | Collins | ............... | B65G 1/026 211/151 |
| 5,181,815 A * | 1/1993 | Haberkorn | ............... | B60P 7/135 182/152 |
| 5,273,170 A * | 12/1993 | Azzopardi | ............... | B65G 1/02 211/189 |
| 5,419,444 A * | 5/1995 | Strom | ............... | B65G 1/026 211/151 |
| 5,524,776 A * | 6/1996 | Hall | ............... | B65G 1/026 211/151 |
| 6,260,719 B1 * | 7/2001 | Azzopardi | ............... | B65G 1/02 211/189 |
| 9,266,673 B2 * | 2/2016 | Hamby | ............... | B65D 19/40 |

* cited by examiner

*Primary Examiner* — Ko H Chan
(74) *Attorney, Agent, or Firm* — Dilworth & Barrese, LLP (57) ABSTRACT

A storage system having side-by-side dual pallet bays is provided. The system includes a single level or stacked multilevel storage bay. Each bay is defined by a series of vertically extending supports and a central divider for storing two rows of pallets. Preferably, there are no vertical supports extending up from the central divider. Rails are provided on both sides of each row for supporting pallets and for pallet transportation/inventory carts to travel under the pallets. The front of the bay should be configured for access by a dual-four forklift, to insert and remove two pallets from the bay at a time.

21 Claims, 5 Drawing Sheets

STORAGE SYSTEM HAVING DUAL-ROW PALLET BAYS

BACKGROUND

The disclosure relates to systems for storing, transporting and managing pallets of goods and more particularly, to a storage bay that can be accessed by a dual-fork forklift, which can lift and transport two pallets of goods at a time.

Storage systems are used in warehouses, department stores, cold storage areas and other storage facilities to store containers of goods. Certain storage systems employ extensive storage rack systems, often called deep rack storage, to store large amounts of a variety of different products. Some of these systems have columns formed of rows of storage bays stacked on top of each other, with two to seven or higher levels and no aisles between columns of storage bays.

Due to the density of the storage area and the limited sight lines and access, it can be time consuming and present logistical problems to maintain accurate inventory records of the goods remaining in storage on the racks. It can also be inconvenient to access goods in the middle of a rack, which is not accessible to a forklift. Some conventional storage systems employ automated mobile data collection and pallet transportation carts that travel under the pallets in storage racks and record inventory information as well as transport pallets within the row. These pallet carts can travel on rail systems located under the pallet storage racks. The bays can be 250 feet long, or longer. Thus, to bring a pallet from one end of the bay to the other, or from a central portion of the bay to an end, an automatically raiseable platform on the cart is used to lift the pallet and transport it to the desired location in the bay.

Figure 1:
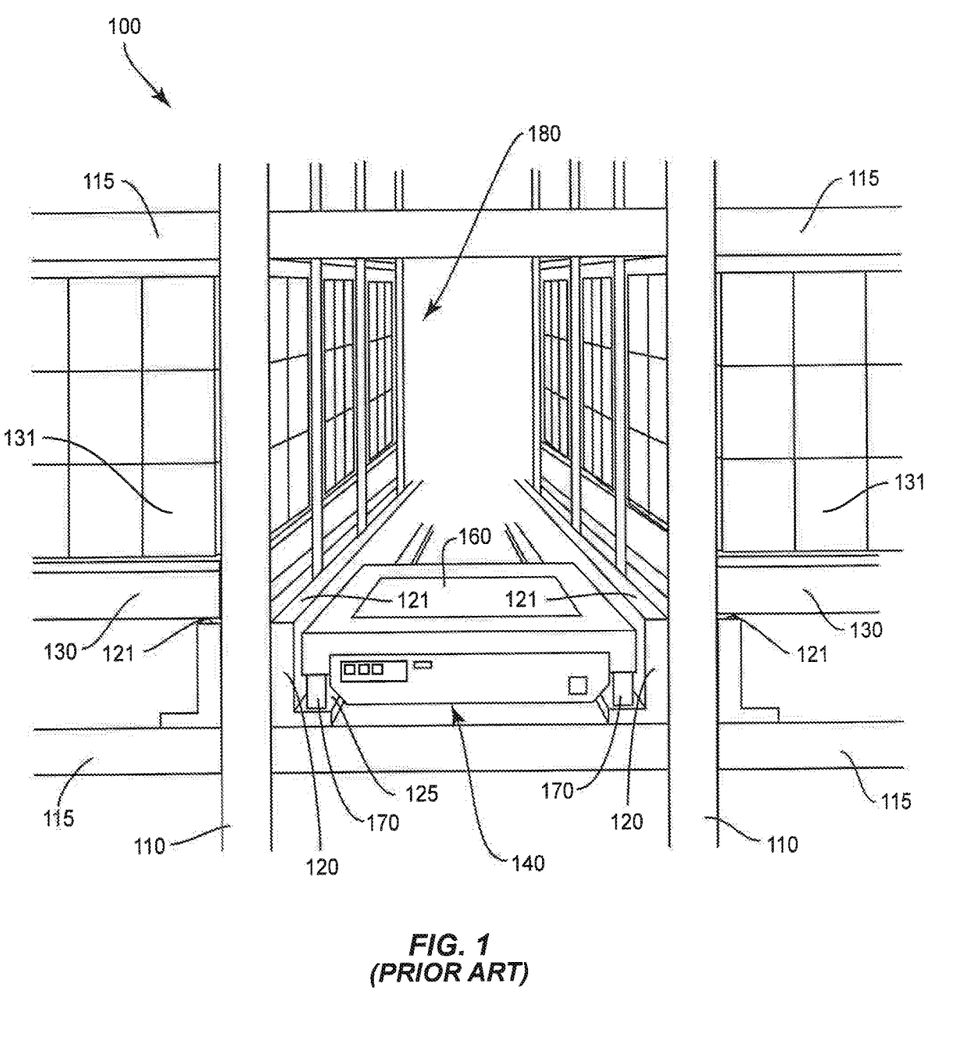
FIG. 1 is a perspective view of a conventional rack storage system.

A conventional multi-level, multi-column rack storage system with no aisles between many of the columns of storage rows of is shown generally in FIG. 1 as a rack storage system 100. Rack storage system 100 includes an array of vertical supports 110, which support horizontal beams 115, to provide structural support. Storage system 100 also includes an array of support rails 120. Rails 120 include a pallet support surface 121, on which a plurality of pallets 130, with a variety of goods 131 are supported.

As indicated above, modern storage systems commonly employ a plurality of robotic pallet transportation carts 140, for both transporting pallets throughout storage system 100 and optionally for collecting inventory information. Pallet transportation cart 140 includes a raiseable surface 160, which can be raised up until it contacts and lifts the bottom of pallet 130. Cart 140 also includes four automatically driven wheels 170. Wheels 170 travel on a cart transportation surface 125 of rail 120. Thus, rails 120 extend into a pallet storage bay 180 and permit carts 140 to travel under pallets 130 along the entire length of each bay 180.

Figure 2:
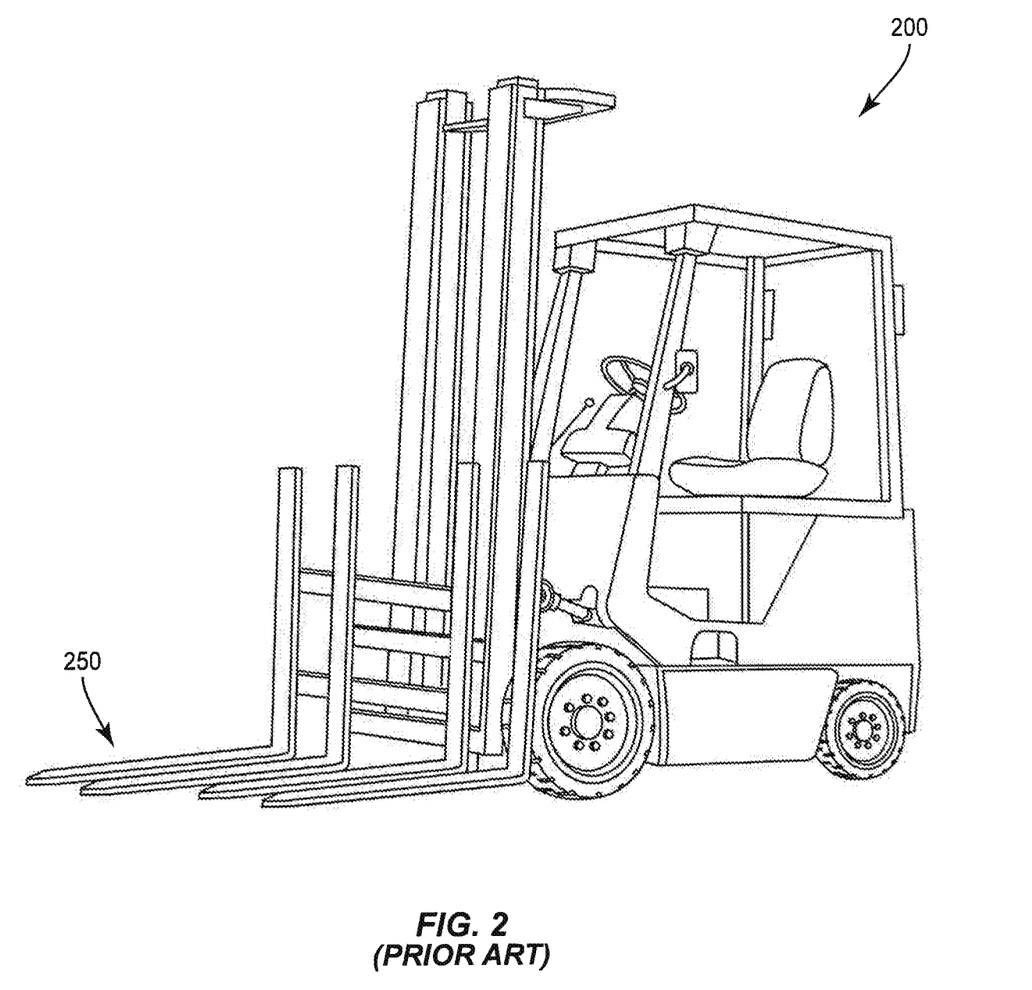
FIG. 2 is a perspective view of a double-fork forklift.

Pallet storage bay 180 is one pallet wide. It is designed to be accessed by a conventional forklift, with a single fork for lifting and transporting a single pallet. However, modern storage facilities have begun to use the dual pallet forklifts. A dual pallet forklift 200 with a double fork 250 is shown generally in FIG. 2. As evident from FIG. 2, double fork 250 is designed to lift and transport two pallets at the same time. However, conventional pallet storage rack systems with pallet transportation carts traveling under the racks of pallets are not sufficiently compatible with dual pallet forklifts. It can be difficult, particularly when a storage bay is three, four or five rows high, to conveniently load or unload two pallets at a time, into a conventionally designed bay. Accordingly, it can be necessary to use a dual fork forklift to transport the pallets around the facility, but to load and unload the pallets onto the rack one pallet at a time.

Accordingly, an improved system for storing and transporting pallets of goods that overcomes drawbacks of the prior art is desirable.

SUMMARY

Generally speaking, in accordance with the invention, a storage system having side-by-side dual pallet bays is provided. The system includes a single level or stacked multi-level storage bay, extending lengthwise from a front, proximal end to a rear, distal end. Each bay is defined by a series of vertically extending supports. If the storage system is multi-level, horizontal beams extend across the width of the storage bay and a second bay is positioned directly over the first bay, and so forth. Even if the storage bay is a single level, the bay must be raised to provide room for a pallet transportation cart to travel under the rack of stored pallets.

From the perspective of viewing into the bay, from front-to-rear, the system includes a left-side pallet row and a right-side pallet row. Each left-side pallet row and right-side pallet row include a left and right pair of a left-side pallet support surface and a right-side pallet support surface. Each left-side pallet support surface and right-side pallet support surface are spaced slightly narrower than the approximate width of a typical pallet (e.g., spaced less than 36"), to provide a surface for supporting a row of pallets extending into the bay. Bays can be 100, 200, or 250 feet deep, or deeper.

The left-side pallet row and right-side pallet row are divided by a central divider. The central divider includes the right side of the left-side pallet row and the left side of the right-side pallet row. There should be no vertical supports extending up from the central divider, at least at the front of each bay and preferably, along the entire length of the central divider. The lack of vertical supports permits the pallets to be stored more closely together.

Each bay also includes a pair of pallet cart rails, extending down the length of the left-side pallet row and the right-side pallet row. The pallet cart rails are located below and inside the spacing of the pair of left-side pallet support surface and right-side pallet support surface. A pallet cart, which can be automated and can be provided to move the pallets and/or collect information regarding the inventory of the pallets includes wheels designed to ride on the rails. The cart is thin enough in height, and the wheels on the cart are positioned such that the top of the cart is below the left-side and right-side pallet support surfaces. Therefore, the cart can travel on the pallet cart rails, underneath a row of pallets located in the storage bay. It can be used to transport pallets (and goods) throughout the bay.

The left-side and right-side pallet rows should be spaced closely enough so that the pallets can be positioned close enough to be installed and removed by a dual pallet forklift. Thus, the central divider should be narrow enough to space the pallets close enough to be engaged by a dual fork forklift. In addition, centering cams (guide ramps) can be provided to help properly position a pallet on the support surface, which may be tens of feet off the ground, as it is loaded into or removed from the bay.

Other objects, advantages and embodiments of the invention will be apparent from the specification and the drawings and the scope of the invention will be indicated in the claims.

BRIEF DESCRIPTION OF THE DRAWINGS

Throughout the specification, like reference numerals will be used to indicate similar elements.

DETAILED DESCRIPTION OF THE PREFERRED EMBODIMENTS

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 3:
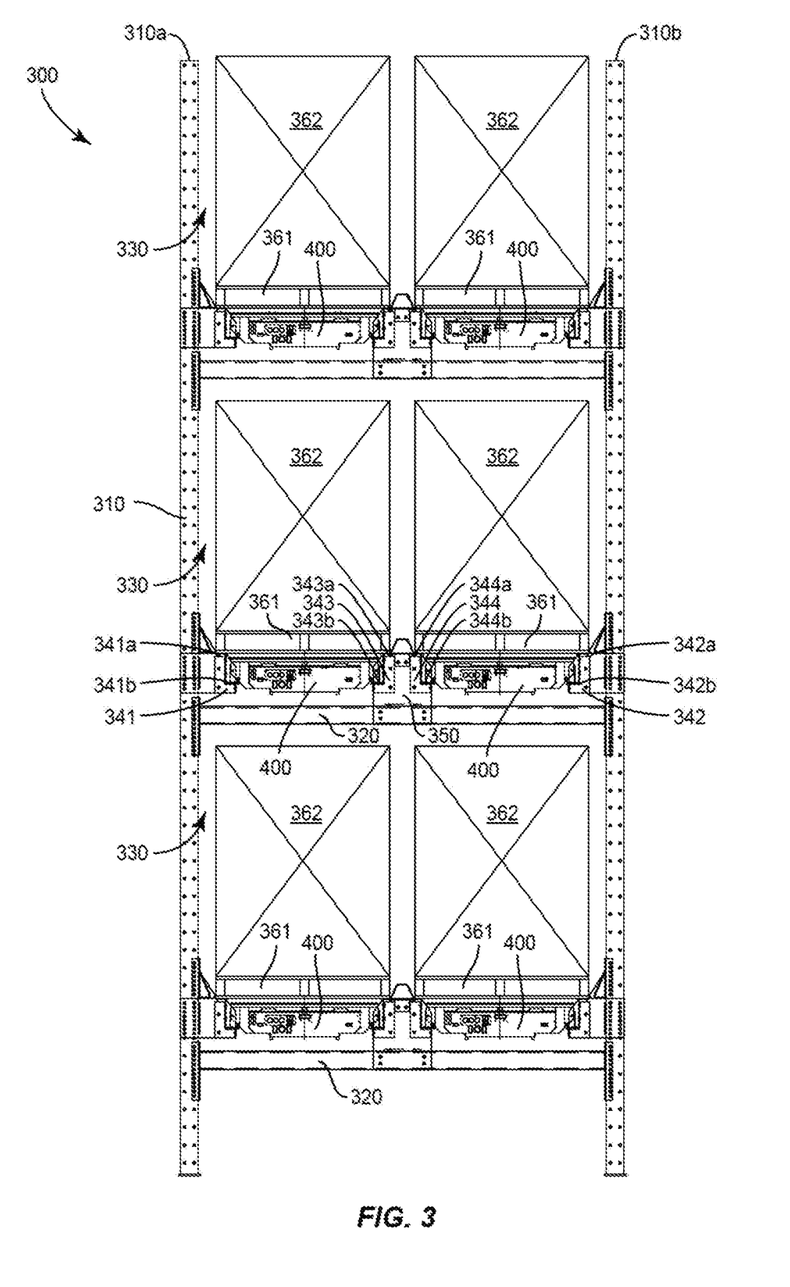
FIG. 3 is a front view of a storage system in accordance with an embodiment of the invention.

FIG. 3 shows one column of a storage rack system 300 in accordance with a preferred embodiment of the invention. System 300 includes a plurality of vertically rising vertical supports 310 having horizontal supports 320 connected therebetween. The pair of vertical supports 310 with the horizontal support 320 therebetween define a dual pallet storage bay 330. From the perspective of looking from a near proximal end lengthwise to a far distal end of storage bay 330 defines a left side defined by left vertical support 310a and a right side defined by a right vertical support 310b. A plurality of storage bays 330 can be stacked on top of each other and positioned side-to-side with each other.

Each storage bay 330 also includes a central divider 350, which is supported by horizontal beam 320. Central divider 350 preferably does not have any vertical supports rising therefrom. A left-side outer support rail 341 is attached to left vertical support 310a; a right-side outer support rail 342 is attached to right vertical support 310b; a left side inner support rail 343 is attached to the left side of central divider 350; and a right side inner support rail 344 is attached to the right side of central divider 350.

In one embodiment of the invention, the lowest storage bay does not have a horizontal beam extending across the vertical supports. In this embodiment of the invention, the outer support rails for the lowest bay are attached to the vertical supports as otherwise discussed herein, and the inner support rails are supported by the ground, e.g., resting on the ground/floor or supported by a post or stanchion, which rests on the ground/floor. With this embodiment of the invention, when there are no pallets stored in this lower storage bay, it is convenient to walk through the storage bay or to drive a floor cleaner or other vehicle into the storage bay, without the obstruction of the horizontal beam or otherwise.

Support rails 341-344 can be formed with an "L" shaped cross-section, with a vertical leg and a horizontal leg. The upper surface of the vertical leg of support rails 341-344 forms a plurality of pallet supporting surfaces 341a-344a, respectively. The upper surface of the horizontal leg forms a plurality of cart supporting surface 341b-344b, respectively. Pallet supporting surfaces 341a-344a are used to support a row of pallets 361 loaded with goods 362. The row of pallets can be 100 feet deep, 250 feet deep or deeper.

Figure 4:
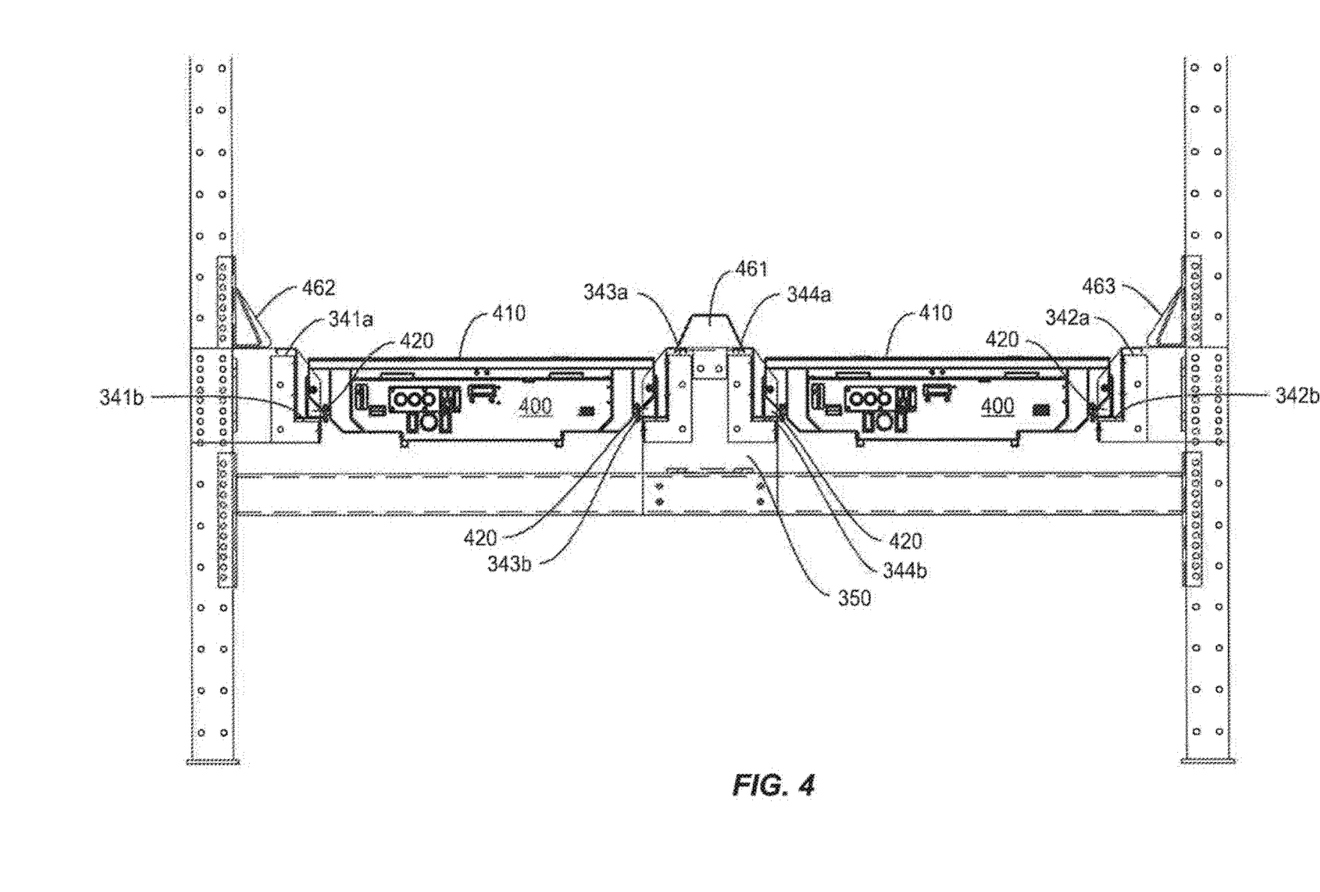
FIG. 4 is an enlarged partial front view of a portion of the storage system of FIG. 3.

Referring to FIG. 4, a pallet cart 400 includes an upper surface 410. Upper surface 410 includes a raiseable platform. If cart 400 is positioned under a pallet 361 and the platform is raised, cart 400 can be used to lift and transport pallet 361 and goods 362 to a selected position within bay 330. When positioned at an end of the bay, one or two pallets 361 with goods 362 can be removed from bay 330 with a forklift.

Cart 410 can include four wheels 420, which ride on cart surfaces 341b-344b. Cart 400 can include a drive motor and a battery for driving the motor. It can also include RF transponders, memory and wireless and wired connections for receiving instructions and/or transmitting data, such as inventory data detected as cart 400 travels under pallets 362, along the length of bay 330.

It is preferred to provide each bay 330 with centering (camming) guide ramps, for the proper positioning of the pallets during loading and unloading. This permits narrower bays. Accordingly, center divider 350 includes a two-sided centering guide 461 to help guide the pallets onto pallet surface 343a or 344a. Similarly, a left side centering (camming) guide 462 and a right side centering (camming) guide 463 are attached to left vertical support 310a and right vertical support 310b, respectively, to properly position the pallets on pallet support surfaces 341a and 342a, respectively. These camming surfaces also assist in the smooth removal of pallets from the storage bays.

Figure 5:
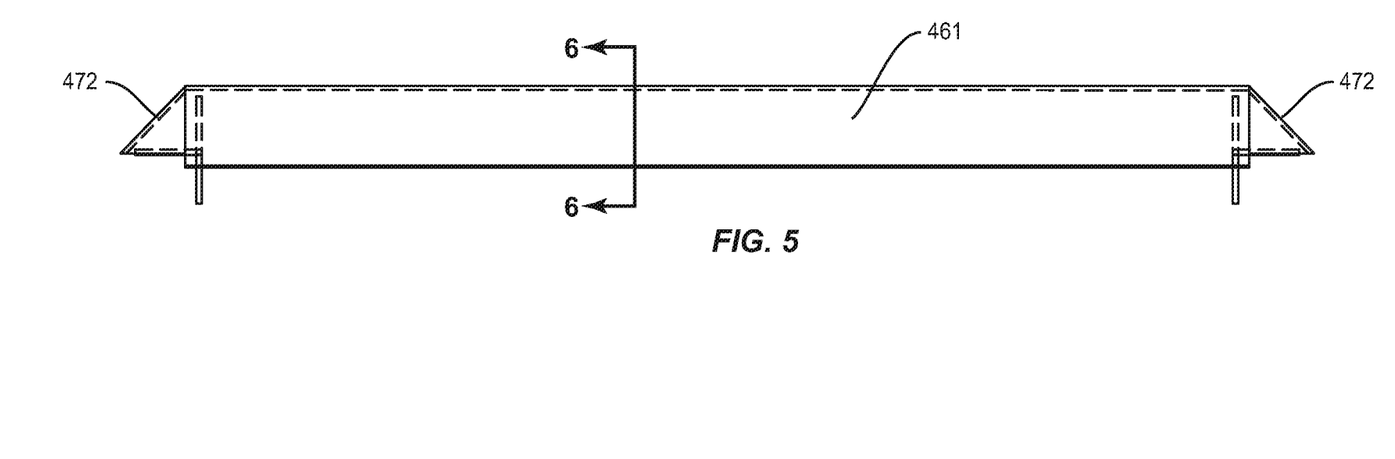
FIG. 5 is a side view of a centering cam for use with a central divider, in accordance with a preferred embodiment of the invention.
Figure 6:
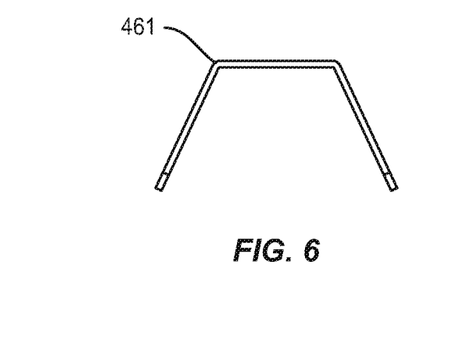
FIG. 6 is a partial cross-sectional view of a section of the centering cam of FIG. 5, taken along line 6-6.

The guiding surfaces of centering guide ramps 461, 462 and 463 should be about 80°-50° from horizontal, preferably about 70°-60°, most preferably about 65°. It should have a vertical height over 2 inches, preferably about 3 to 5 inches, most preferably about 4 inches. Centering guide 461 is also shown in side view and cross-sectional view in FIGS. 5 and 6, respectively. The top surface of centering guide 461 should be narrow enough, for the tight stacking of pallets. Accordingly, it should be less than about 5 inches and more preferably, less than about 4 inches wide, most preferably about 3.5 inches wide. For similar reasons, the base of centering guide 461 should be less than 9 inches wide, preferably less than 8 inches wide and most preferably about 7 inches wide. A front end 472 and a rear end 473 should also be beveled, to assist with smooth movement of pallets in the bay. Thus, ends 472 and 473 should be at an angle of about 30° to 60°, preferably 40° to 50° and most preferably about 45° to horizontal.

Figure 7:
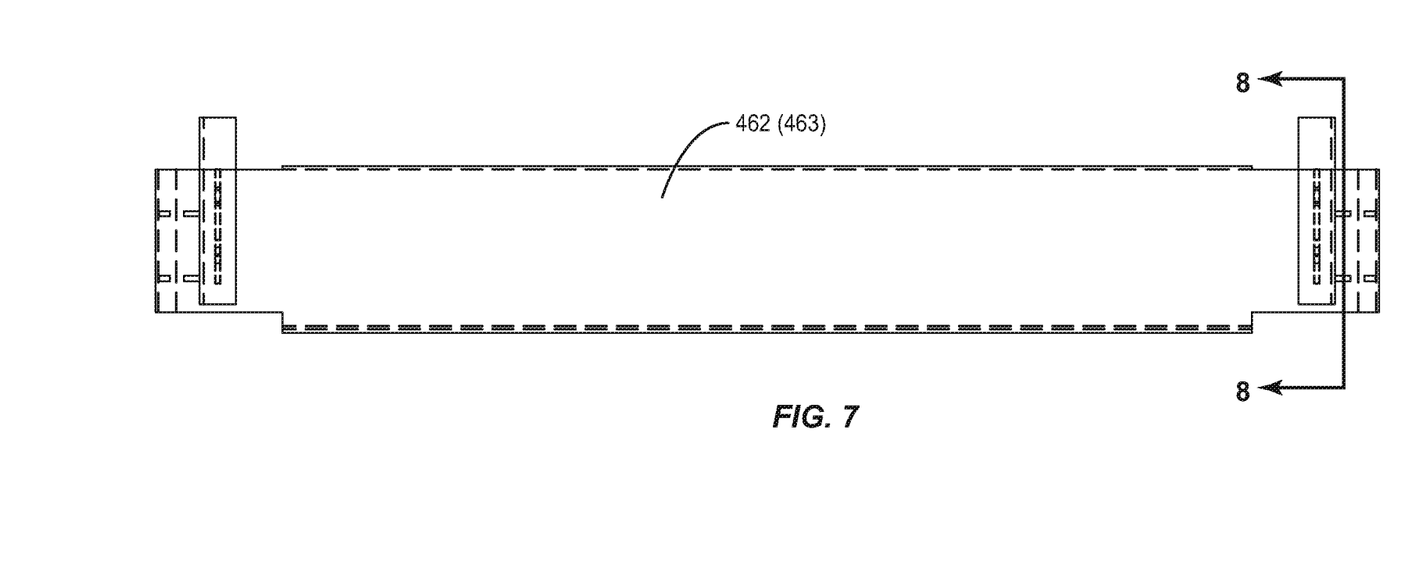
FIG. 7 is a side view of a side centering cam, in accordance with a preferred embodiment of the invention.
Figures 7, 8, 9:
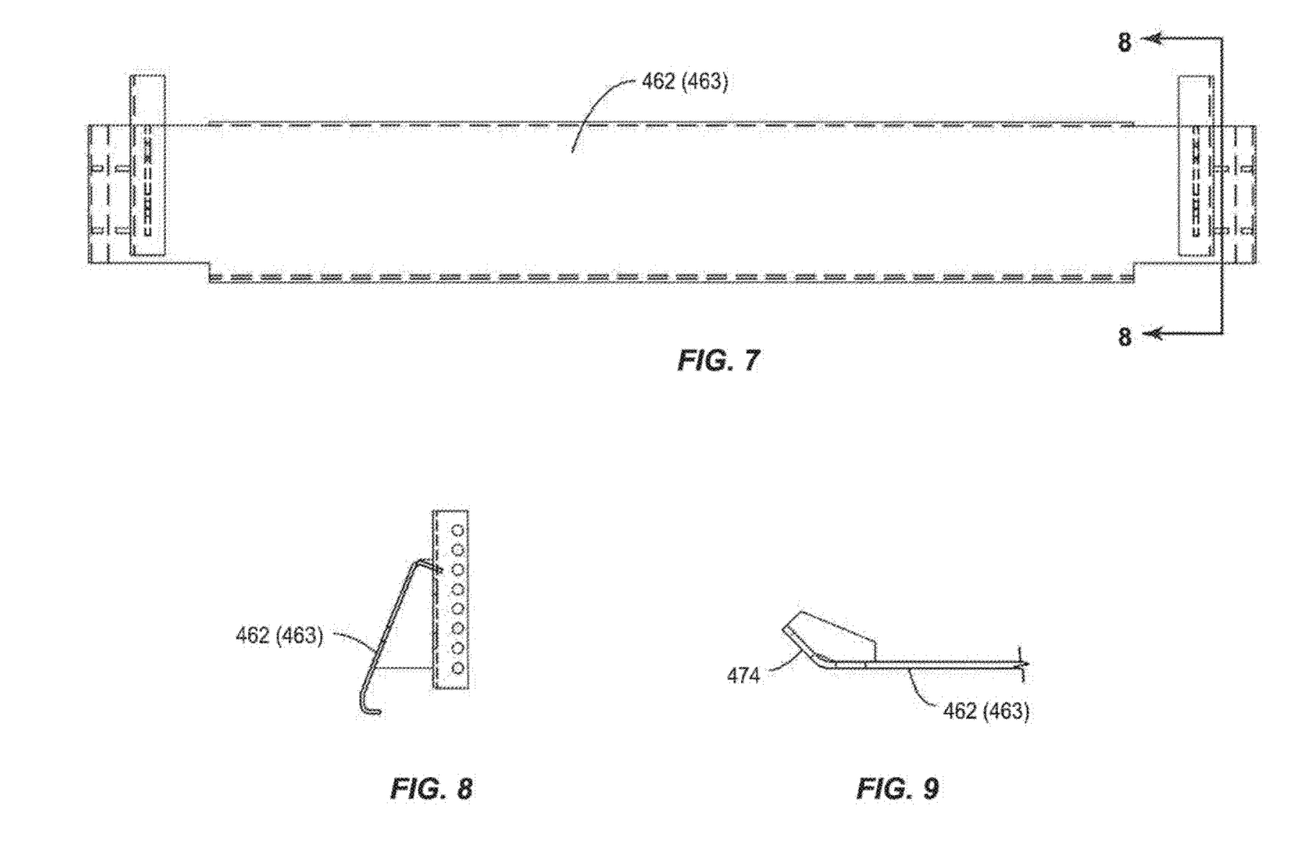
FIG. 8 is a cross-sectional view of the side centering cam of FIG. 7, taken along line 8-8, in accordance with a preferred embodiment of the invention.
FIG. 9 is a partial top view of the end of the centering cam of FIG. 7.
Figure 8:
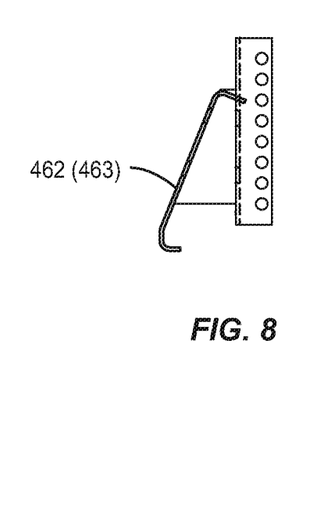
Figure 9:
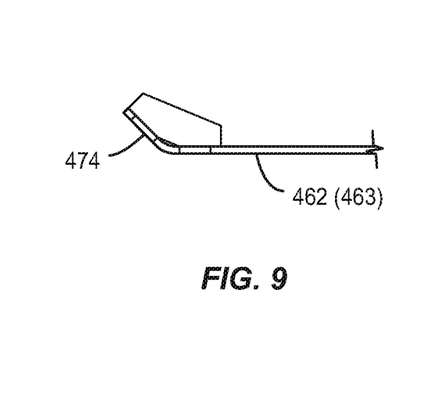

Left or right side centering guide 462 or 463 is shown in side view in FIG. 7. An end cross-sectional view of side centering guide 462 (463), taken along line 8-8, is shown in FIG. 8. As shown in FIG. 8, side centering guide 462 (463) has a C-channel construction and is angled from horizontal, to provide a camming surface, to assist in the proper insertion and removal of pallets from bay 330. Preferably, this angle is about 60° to 80°, more preferably 65° to 75° and most preferably, about 68°. Side centering guide 462 (463) should be about 5 to 8 inches in vertical height, preferably about 6 to 7 inches high.

An end 474 of side centering guide 462 (463) should be beveled, to promote smooth insertion and removal of pallets from bay 330. A top view of the end of side centering guide 462 (463) is shown in FIG. 9. This angle should be about 35° to 55°, preferably 40° to 50°, most preferably about 45°.

Each bay 330 should have an inner clearance of about 92 inches to store pallets side-by-side. 90 to 94 inches inner clearance is acceptable, 91-93 is preferred. The height of each bay should be able to store a pallet-plus-goods at least 52 inches high, preferably 55-60 inches. The spacing between the pallet support surfaces should be at least 35 inches, 35-45 inches is preferred, 38-42 inches is more preferred and about 39.5-40.5 inches is most preferred. About 2-6 inches clearance should be provided between the pallets and goods and either the adjacent pallet or the adjacent vertical support. About 3.5-4.5 inches is more preferred.

The respective ends of the cart support surfaces of the support rails should be sufficiently close to each other, to permit the pallets in the left and right rows of a bay to be close enough to be accessed by a dual fork forklift. Preferably, the ends of the cart support surfaces should be about 10-15 inches apart, preferably 12-14 inches apart, most preferably 13-13.25 inches. The outer edges of the pallet support surfaces supported by the central divider should be about 6-10, preferably 7-9, most preferably 7.5-8.5 inches apart.

The horizontal beams should be strong enough to hold two pallets plus goods, totaling at least about 2000 pounds each, preferably over about 2500 pounds each and even up to 3000 pounds each. Accordingly, the horizontal beams should be formed from 4 gauge quarter-inch thick steel. The beams should have a C-channel construction. In particular, the horizontal beam should be formed from ¼ inch hot rolled structural steel with a C-channel structure.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A storage system, comprising
   a storage bay sized to include two side-by-side rows of pallets extending from a front to a rear in a lengthwise direction, having a left side and a right side from the perspective of viewing from the front to the rear of the bay, the left and right sides of the bay defined by left-side and right-side upwardly extending vertical supports and the bottom of the bay defined by a horizontal beam attached to and extending from the left-side vertical support to the right-side vertical support;
   at least one central divider having a left-side and a right-side supported by the horizontal beam and extending in a lengthwise direction from the front to the rear of the bay to define a left row and a right row in the lengthwise direction, the left row and the right row each and adapted to receive and store a left row and a right row of pallets and no vertical support member extending up from the front of the central divider;
   a left outer pallet support at the left-side vertical support, a right outer pallet support at the right-side vertical support, a left inner pallet support at the left-side of the central divider and a right inner pallet support at the right-side of the central divider;
   the left outer pallet support having an upward facing pallet support surface and an upward facing cart support surface located right of and below the left outer pallet support surface, the right outer pallet support having an upward facing pallet support surface and an upward facing cart support surface located left of and below the right outer pallet support surface, the left inner pallet support having an upward facing pallet support surface and an upward facing cart support surface located left of and below the left inner pallet support surface, and the right inner pallet support having an upward facing pallet support surface and an upward facing cart support surface located right of and below the right inner pallet support surface, the respective upward facing pallet support surfaces constructed and positioned to support the edges of a pallet, and each of the respective upward facing cart support surfaces constructed and positioned to support a wheel of a pallet cart positioned in the left or the right row;
   the vertical supports, central divider and pallet supports positioned and arranged to make side-by-side pallets with goods resting on the pallet support surfaces accessible to a dual fork forklift.

2. The storage system of claim 1, wherein the pallet supports have a generally "L" shaped cross-section and the pallet support surface is the top of a vertical leg of the pallet support and the cart support surface is on the horizontal leg of the pallet support.

3. The storage system of claim 1, wherein there are no vertical supports rising along the entire length of the central divider.

4. The storage system of claim 1, wherein the horizontal beam is strong enough to support two 2500 pound pallets positioned one on each side of the central divider.

5. The storage system of claim 4, wherein the horizontal beam is formed from ¼ inch hot rolled structural steel with a C-channel structure.

6. The storage system of claim 1, wherein the cart support surfaces of the respective left inner pallet support and right inner pallet support are about 12-14 inches apart.

7. The storage system of claim 1, wherein the cart support surfaces of the respective left inner pallet support and right inner pallet support are about 13-13.25 inches apart.

8. The storage system of claim 1, wherein the inner edges of the left inner pallet support and right inner pallet support are about 7-9 inches apart.

9. The storage system of claim 1, wherein the inner edges of the left inner pallet support and right inner pallet support are about 8-8.25 inches apart.

10. The storage system of claim 1 and comprising a lower bay under the storage bay, the lower bay having a lower left outer pallet support at the left-side vertical support, a right outer pallet support at the right-side vertical support, a lower left inner pallet support at a lower central divider and a lower right inner pallet support at the lower central divider;

the lower left outer pallet support, lower right outer pallet support, lower left inner pallet support, and the lower right inner pallet support each having a lower upward facing pallet support surface constructed and positioned to support the edges of a pallet, and a lower upward facing cart support surface located inward and below the respective lower left and right pallet support services, the lower cart support surfaces constructed and positioned to support the wheels of a lower left row and a lower right row pallet cart positioned on the lower left row and lower right row cart support surfaces;

the lower central divider supported by ground;

the vertical supports, lower central divider and lower pallet supports positioned and arranged to make side-by-side pallets with goods resting on the pallet support surfaces accessible to a dual fork forklift and to have no bather to prevent a vehicle from driving on the ground, into the lower storage bay.

11. A storage system, comprising a storage bay extending from a front to a rear in a lengthwise direction, having a left side and a right side from the perspective of viewing from the front to the rear of the bay, the left and right sides of the bay defined by left-side and right-side upwardly extending vertical supports and the bottom of the bay defined by a horizontal beam attached to and extending from the left-side vertical support to the right-side vertical support;

at least one central divider having a left-side and a right-side supported by the horizontal beam and extending in a lengthwise direction from the front to the rear of the bay to define a left row and a right row in the lengthwise direction;

a left outer pallet support at the left-side vertical support, a right outer pallet support at the right-side vertical support, a left inner pallet support at the left-side of the central divider and a right inner pallet support at the right-side of the central divider;

the left outer pallet support, the right outer pallet support, the left inner pallet support, and the right inner pallet support each having an upward facing pallet support surface constructed and positioned to support the edges of a pallet, and an upward facing cart support surface constructed and positioned to support a wheel of a pallet cart;

at least one positioning guide above the left and the right inner pallet support surfaces and the left and the right outer pallet support surfaces, adapted to guide the pallets into position on the pallet support surfaces as the pallets are installed on the pallet support surfaces.

12. The storage system of claim 11, wherein at least one of the positioning guides comprises inclined surfaces, having an angle between about 55° to 75° from horizontal, above the pallet support surfaces.

13. The storage system of claim 12, wherein the positioning guide comprises inclined surfaces, having an angle between about 70° to 60°, from horizontal, above the pallet support surfaces.

14. The storage system of claim 11, wherein a centering guide is located over the central divider and has a generally trapezoidal cross section.

15. The storage system of claim 11, wherein a centering guide having inclined surfaces is located over the central divider and has a vertical height of over 2 inches.

16. The storage system of claim 14, wherein the centering guide has a vertical height of about 3 to 5 inches.

17. The storage system of claim 11, wherein a centering guide is located over the left outer pallet support surface and the right outer pallet support surface and each has a generally triangular cross section.

18. The storage system of claim 11, wherein a centering guide is located over the left outer pallet support surface and the right outer pallet support surface and each has a vertical height of about 5 to 8 inches.

19. The storage system of claim 11, wherein an end of a centering guide is located over the left outer pallet support surface and the right outer pallet support surface and each is inclined outwardly, to help guide a pallet into the bay as a pallet is installed into the bay.

20. The storage system of claim 11, wherein an end of a centering guide is located over the left inner pallet support surface and over the right inner pallet support surface and an end of another centering guide is located over the left and the right outer pallet support surfaces and both ends are inclined outwardly, to help guide a pallet into a bay as a pallet is installed into the bay.

21. The storage system of claim 11, comprising a lower storage bay extending from the front to the rear in the lengthwise direction, under the storage bay, having a lower left-side and a lower right-side from the perspective of viewing from the front to the rear of the bay, the left and right sides of the lower storage bay defined by the left-side and right-side upwardly extending vertical supports and the bottom of the bay defined by a ground surface;

at least one lower central divider having a left-side and a right-side supported by the ground, the lower central divider extending in a lengthwise direction from the front to the rear of the bay to define a left row and a right row in the lengthwise direction;

a lower left outer pallet support at the left-side vertical support, a lower right outer pallet support at the right-side vertical support, a lower left inner pallet support at the left-side of the central divider and a lower right inner pallet support at the right-side of the central divider;

the lower left outer pallet support, lower right outer pallet support, lower left inner pallet support, and lower right inner pallet support each having an upward facing lower pallet support surface constructed and positioned to support the edges of a pallet, and a lower upward facing cart support surface located inward and below the respective left and right lower pallet support surfaces;

at least one lower positioning guide above the left and the right lower inner pallet support surfaces and the left and the right lower outer pallet support surfaces, adapted to guide the pallets into position on the lower pallet support surfaces as the pallets are installed on the lower pallet support surfaces.

* * * * *

UNITED STATES PATENT AND TRADEMARK OFFICE
CERTIFICATE OF CORRECTION

PATENT NO. : 10,752,441 B1
APPLICATION NO. : 16/291190
DATED : August 25, 2020
INVENTOR(S) : Iellimo Page 1 of 8

It is certified that error appears in the above-identified patent and that said Letters Patent is hereby corrected as shown below:

On the Title Page

Under item (57) abstract "21 Claims, 5 Drawing Sheets" should read --21 Claims, 6 Drawing Sheets-- as attached.

In the Drawings

Delete drawings sheets 1-5 and substitute therefor the drawing sheets, consisting of figs. 1-6 as shown on the attached page.

Signed and Sealed this
First Day of July, 2025

Coke Morgan Stewart
*Acting Director of the United States Patent and Trademark Office*

(12) United States Patent
Iellimo et al.

(10) Patent No.: US 10,752,441 B1
(45) Date of Patent: Aug. 25, 2020

(54) STORAGE SYSTEM HAVING DUAL-ROW PALLET BAYS

(71) Applicant: FRAZIER INDUSTRIAL COMPANY, Long Valley, NJ (US)

(72) Inventors: Domenick Iellimo, Forked River, NJ (US); Aaron Iellimo, Califon, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 16/291,190

(22) Filed: Mar. 4, 2019

(51) Int. Cl.
*B65G 1/04* (2006.01)
*B65D 19/42* (2006.01)

(52) U.S. Cl.
CPC .......... *B65G 1/0492* (2013.01); *B65D 19/42* (2013.01); *B65G 2201/0267* (2013.01)

(58) Field of Classification Search
CPC .......... B65G 1/0492; B65G 2201/0267; B65G 2207/40; B65D 19/42; B07C 3/087
See application file for complete search history.

(56) References Cited

U.S. PATENT DOCUMENTS

| | | | | |
|---|---|---|---|---|
| 4,197,047 A | * | 4/1980 | Haldimann | B65G 1/06 414/276 |
| 4,341,313 A | * | 7/1982 | Doring | B65G 1/06 211/151 |
| 5,137,159 A | * | 8/1992 | Collins | B65G 1/026 211/151 |
| 5,181,815 A | * | 1/1993 | Haberkorn | B60P 7/135 182/152 |
| 5,273,170 A | * | 12/1993 | Azzopardi | B65G 1/02 211/189 |
| 5,419,444 A | * | 5/1995 | Strom | B65G 1/026 211/151 |
| 5,524,776 A | * | 6/1996 | Hall | B65G 1/026 211/151 |
| 6,260,719 B1 | * | 7/2001 | Azzopardi | B65G 1/02 211/189 |
| 9,266,673 B2 | * | 2/2016 | Hamby | B65D 19/40 |

* cited by examiner

*Primary Examiner* — Ko H Chan (74) *Attorney, Agent, or Firm* — Dilworth & Barrese, LLP (57) ABSTRACT

A storage system having side-by-side dual pallet bays is provided. The system includes a single level or stacked multilevel storage bay. Each bay is defined by a series of vertically extending supports and a central divider for storing two rows of pallets. Preferably, there are no vertical supports extending up from the central divider. Rails are provided on both sides of each row for supporting pallets and for pallet transportation/inventory carts to travel under the pallets. The front of the bay should be configured for access by a dual-four forklift, to insert and remove two pallets from the bay at a time.

21 Claims, 6 Drawing Sheets